United States Patent
Yamazaki et al.

(10) Patent No.: US 7,324,868 B2
(45) Date of Patent: Jan. 29, 2008

(54) DIE FOR A PRESS BRAKE AND METHOD FOR PRODUCING THE SAME

(75) Inventors: Tsunehiko Yamazaki, Aichi pref. (JP); Naoomi Miyakawa, Aichi pref. (JP)

(73) Assignee: Yamazaki Mazak Corporation, Aichi pref (JP)

( * ) Notice: Subject to any disclaimer, the term of this patent is extended or adjusted under 35 U.S.C. 154(b) by 0 days.

(21) Appl. No.: 11/419,524

(22) Filed: May 22, 2006

(65) Prior Publication Data

US 2007/0005176 A1 Jan. 4, 2007

(51) Int. Cl.
*G06F 19/00* (2006.01)

(52) U.S. Cl. .................. 700/166; 700/98; 700/117; 700/165; 700/182; 72/389.3; 72/478

(58) Field of Classification Search .................. 700/98, 700/117, 159, 165, 166, 182; 72/31.1, 379.2, 72/381, 389.3, 413, 478
See application file for complete search history.

(56) References Cited

U.S. PATENT DOCUMENTS 3,474,657 A * 10/1969 Spiegel .................. 72/478
5,878,619 A * 3/1999 Walczak .................. 72/389.3
6,662,618 B2 * 12/2003 Wong .................. 72/379.2

FOREIGN PATENT DOCUMENTS

| GB | 2392861 | 3/2004 |
|----|---------|--------|
| JP | 02-229621 | 9/1990 |
| JP | 2000-140941 | 5/2000 |
| JP | 2001-001048 | 1/2001 |
| JP | 2001-205338 | 7/2001 |

OTHER PUBLICATIONS

European Search Report for corresponding Application No. 06405206.1 dated Nov. 28, 2006.

* cited by examiner

*Primary Examiner*—Kidest Bahta
*Assistant Examiner*—Charles Kasenge
(74) *Attorney, Agent, or Firm*—Renner, Otto, Boisselle & Sklar, LLP (57) ABSTRACT

There are provided a method for producing a die for press brake easily and a die. Three-dimensional models of an upper die 10 and a lower die 20 are prepared based on the data of a work $W_{10}$. The lower die 20 is divided into plate-shaped die elements 201 to 20$n$, and each element is subjected to three-dimensional laser beam machining. The die elements are fastened to complete the lower die. The upper die is also produced by the same process.

4 Claims, 10 Drawing Sheets

DIE FOR A PRESS BRAKE AND METHOD FOR PRODUCING THE SAME

The present application is based on Japanese patent application No. 2004-315418 filed on Oct. 29, 2004, the entire contents of which are hereby incorporated by reference.

BACKGROUND OF THE INVENTION

1. Field of the Invention

The present invention relates to a die for press brake having a construction in which many flat plate-shaped die elements are laminated.

2. Description of the Related Art

Figure 9:
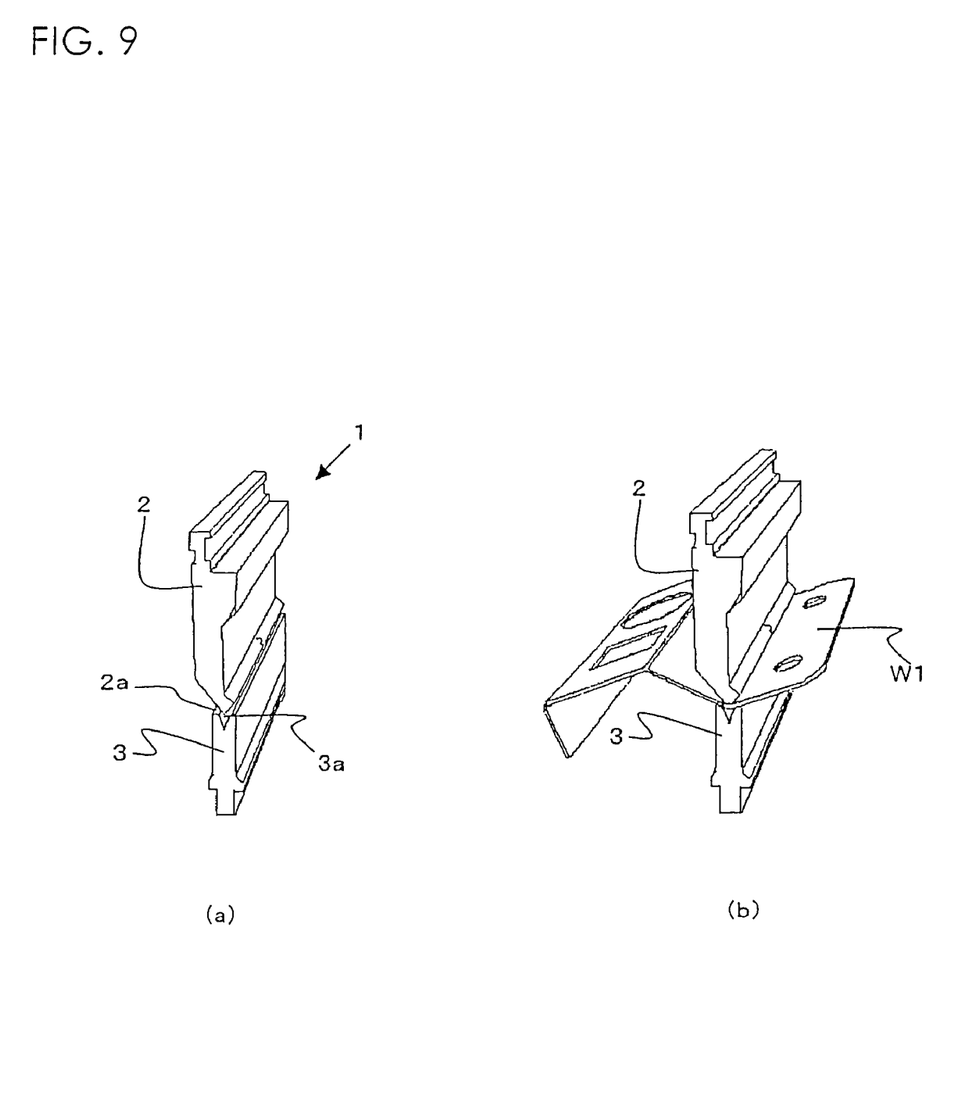
FIG. 9 is an explanatory view of a conventional die.

FIG. 9(A) shows a general die for press brake. The die for press brake generally denoted by reference numeral 1 has an upper die 2 and a lower die 3.

In the lower line portion of the upper die 2, a bending blade 2a is formed, and in the upper line portion of the lower die 3, a V-groove 3a is formed.

When a work $W_1$, which is a product, is bent, a raw material is held between the upper die 2 and the lower die 3, and pressing is performed, as shown in FIG. 9(B).

Such a die for press brake has been disclosed, for example, in Japanese Patent Laid-Open Publication No. 2000-140941 (Patent Document 1).

Also, a construction in which the die for press brake is divided has been disclosed in Japanese Patent Laid-Open Publication No. 2001-205338 (Patent Document 2) and Japanese Patent Laid-Open Publication No. 2001-1048 (Patent Document 3).

Figure 10:
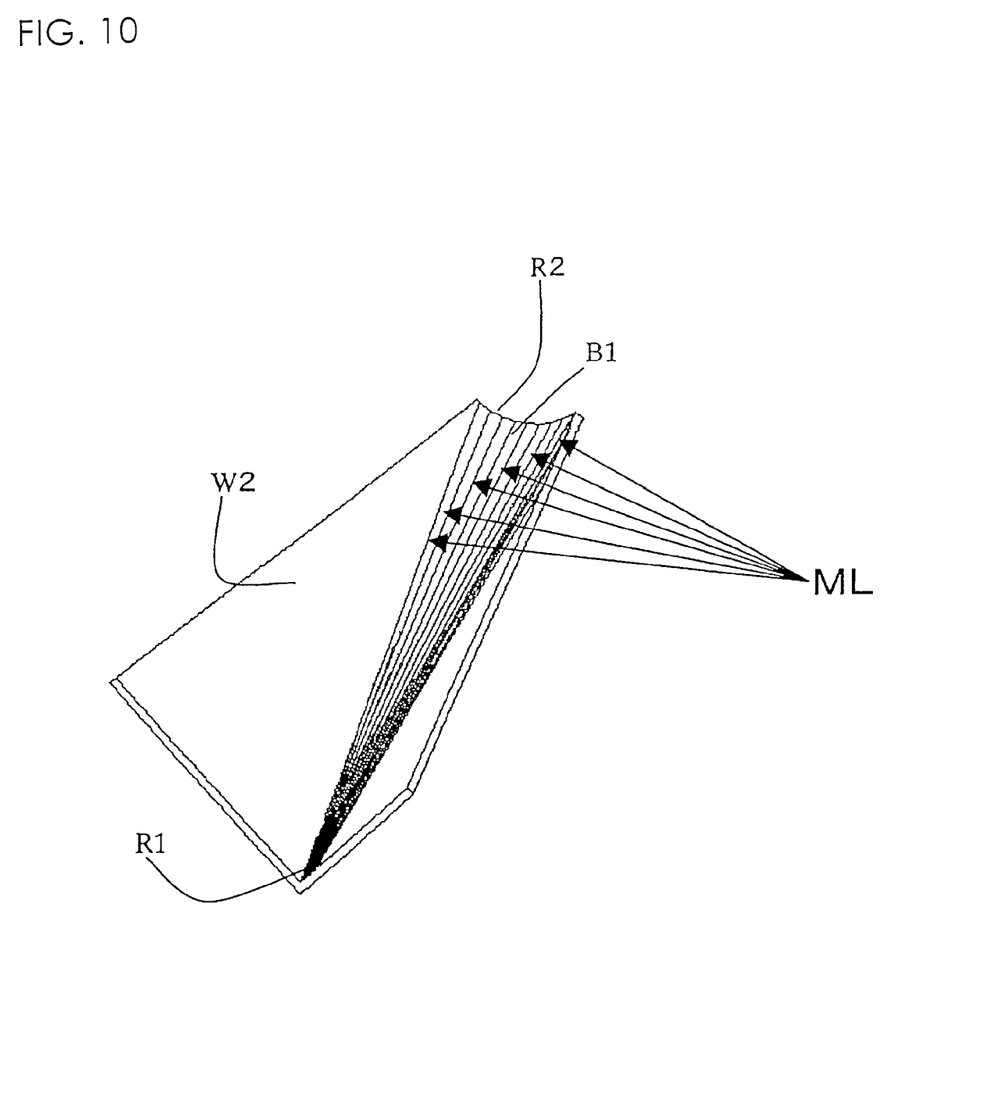
FIG. 10 is an explanatory view of a bending operation using a conventional die.

When the above-described conventional die for press brake is used to bend a work having a curved portion $B_1$ in which the radius of curvature changes continuously from a curved portion $R_1$ having a small radius of curvature to a curved portion $R_2$ having a large radius of curvature as in the case of a work $W_2$ shown in FIG. 10, a plurality of bending operations performed along a plurality of bend lines ML must be repeated.

However, even if the above-described bending operations are performed a plurality of times, the curved portion $B_1$ is a collection of straight-line bend portions, and a continuous curved surface cannot be formed.

An object of the present invention is to provide a die for press brake in which a curved surface having a continuously changing radius of curvature can be formed by one pressing operation.

SUMMARY OF THE INVENTION

A method for producing a die for press brake which is formed by an upper die and a lower die includes as fundamental means the steps of preparing three-dimensional CAD data for a product to be bent; preparing three-dimensional CAD data corresponding to shapes of the upper die and the lower die for press brake based on the three-dimensional CAD data for the product; dividing the die into plate-shaped die elements having a uniform thickness based on the three-dimensional CAD data for the die; preparing a laser beam machining program for each divided die element; manufacturing each die element by subjecting a raw material to laser beam machining by using the machining program; and producing the die by assembling the die elements.

Also, the die for press brake has plate-shaped die elements having a uniform thickness, each die element is fabricated into a predetermined shape by three-dimensional laser beam machining; and a fastening member for fastening all of the die elements is provided.

According to the present invention, the die is made up of the plate-shaped die elements, and each of the plate-shaped die elements is formed by three-dimensional laser beam machining. Therefore, a die corresponding to a case where the radius of curvature and the shape defined on a plane perpendicular to the lengthwise direction of the die for a press brake, which is a work, change or a case where the radius of curvature and the shape change continuously and linearly in the lengthwise direction of the die can be produced easily.

DETAILED DESCRIPTION OF THE PREFERRED EMBODIMENTS

Figure 1:
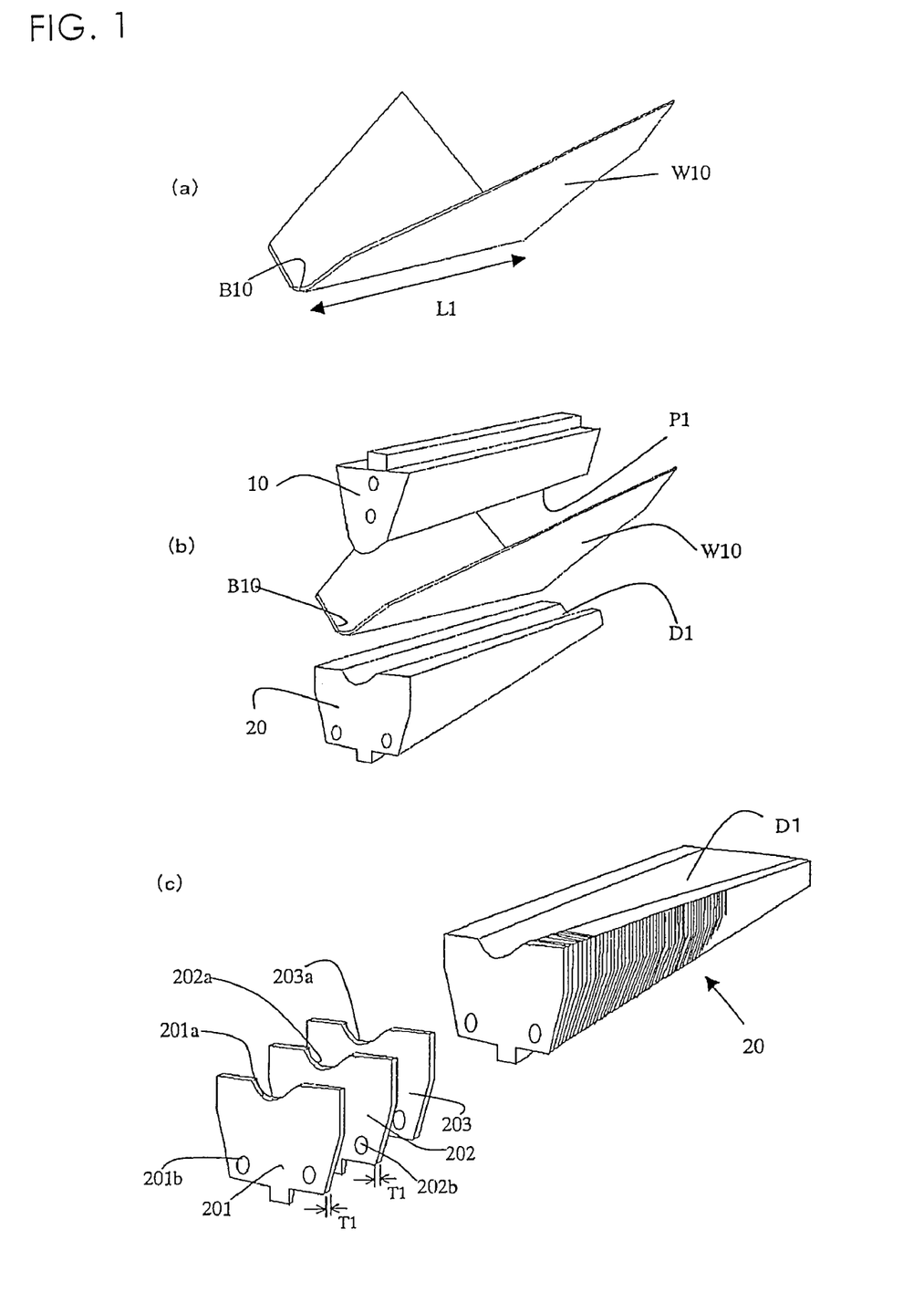
FIG. 1 is an explanatory view showing the principle of the present invention.

FIG. 1 is an explanatory view showing the principle of the present invention. A work $W_{10}$, which is a product, shown in FIG. 1(A) has a bend line $B_{10}$ such that the shape in the bending direction $L_1$ and the shape in the direction perpendicular to the bending direction change successively.

First, a model of the work $W_{10}$ is prepared by three-dimensional CAD based on the data of the work.

Next, die models for an upper die (punch) 10 and a lower die (die) 20 are prepared by three-dimensional CAD using the model of the work $W_{10}$ as shown in FIG. 1(B).

The upper die 10 and the lower die 20 have a punch portion $P_1$ and a die portion $D_1$, respectively, corresponding to the bend shape of the work $W_{10}$.

Subsequently, as shown in FIG. 1(C), the three-dimensional model of the lower die 20 is sliced into many plate-shaped lower die elements 201, 202, 203, ... 20n, and an NC program for three-dimensional machining of each lower die element is prepared from the sliced model. The first lower die element 201, which is formed by a metallic sheet having a thickness $T_1$, is cut out of a raw material by a three-dimensional laser beam machine. For this first lower die element 201, a first die portion 201a is formed by laser beam machining.

Also, in the first lower die element 201, through holes 201b that are used at the time of assembly are formed.

The second lower die element 202 adjacent to the first lower die element 201 has a thickness $T_1$ likewise, and is formed by laser beam machining. The second lower die element 202 has a second die portion 202a.

This lower die element 202 is also formed with through holes 202b for assembly.

Hereunder, a necessary number of lower die elements are fabricated by laser beam machining.

Figure 2:
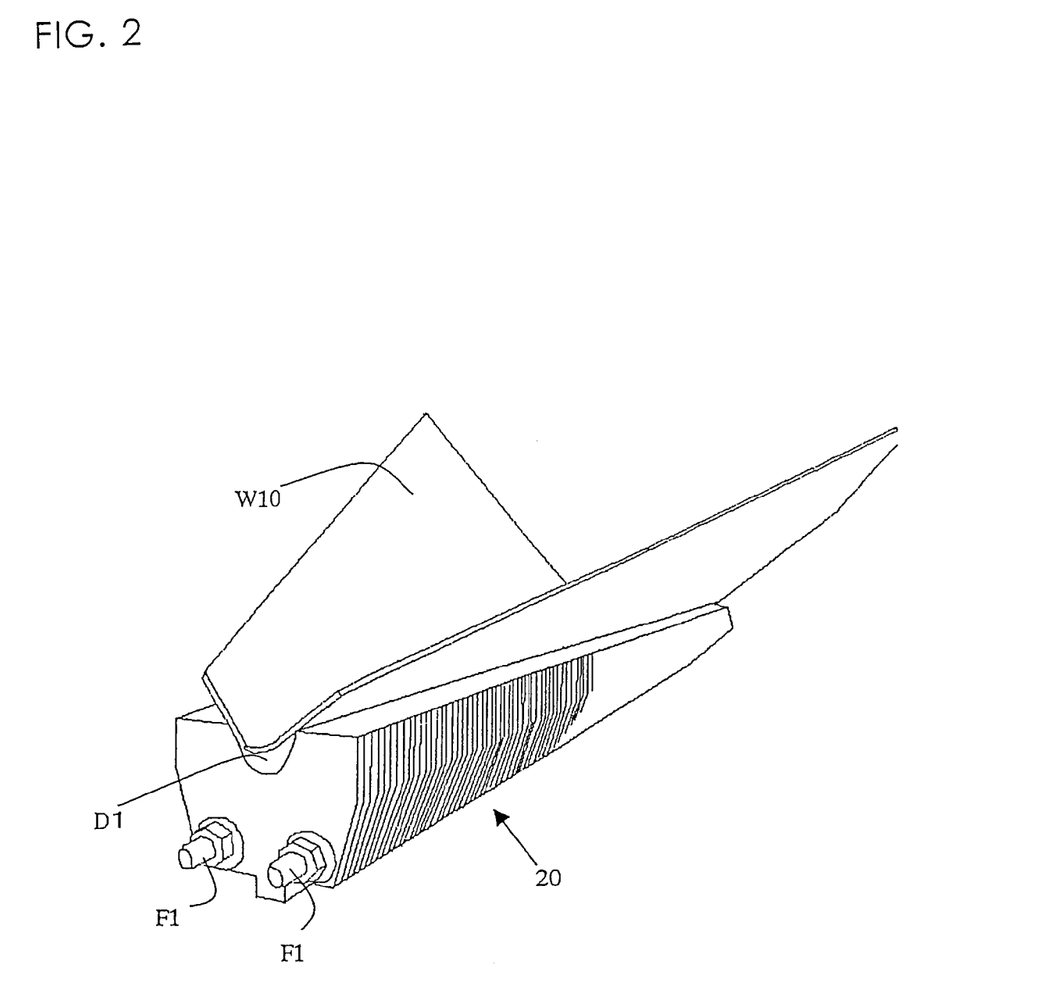
FIG. 2 is an explanatory view showing an assembly of die in accordance with the present invention.

FIG. 2 shows a state in which the lower die elements fabricated in the above-described process are assembled by using fastening members $F_1$, such as bolts and nuts to complete the lower die 20.

This lower die 20 has a required die portion $D_1$. The upper die 10 is also fabricated by the same process.

Figure 3:
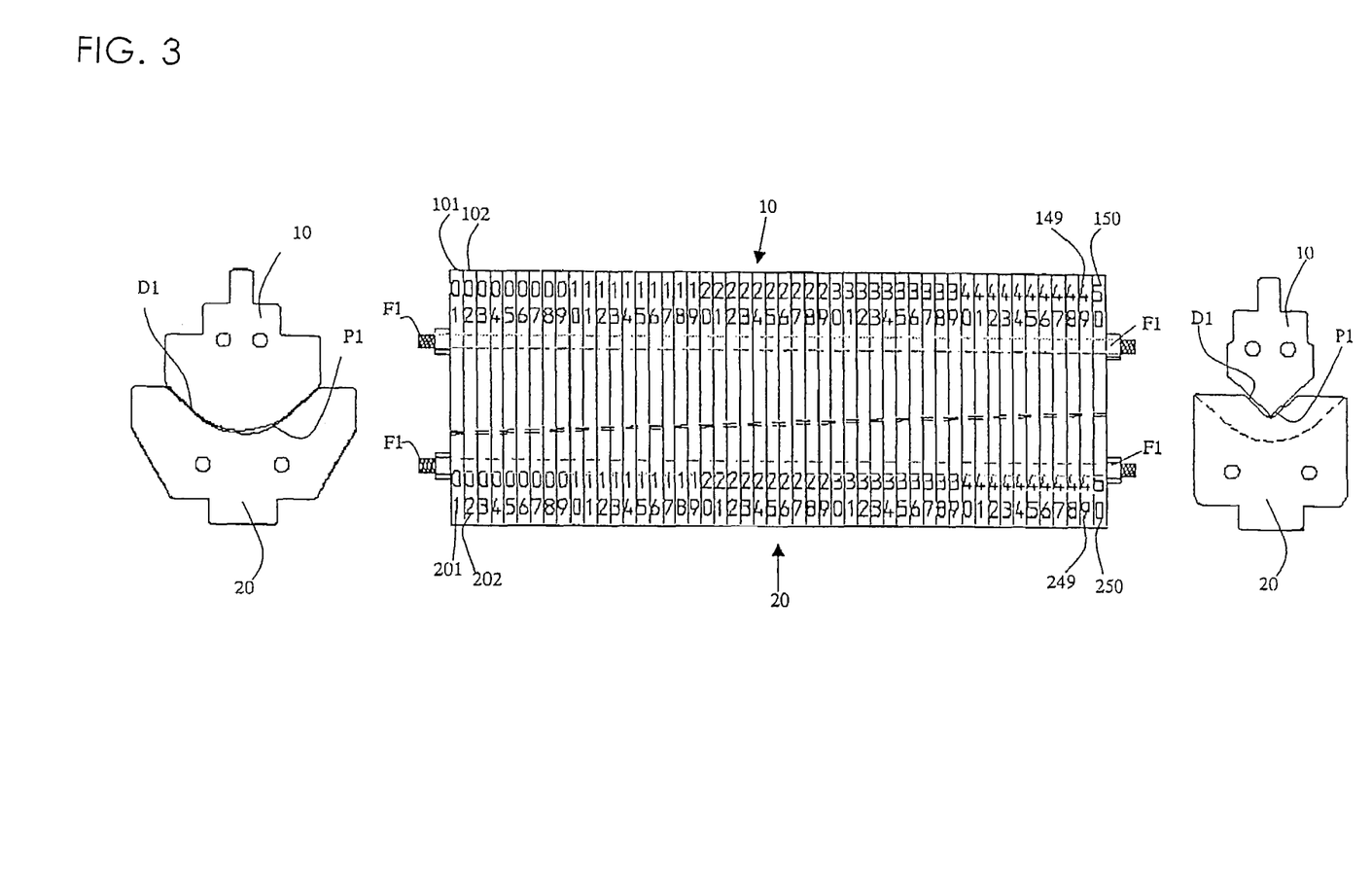
FIG. 3 is an explanatory view showing a configuration of a practical die for press brake utilizing the principle of the present invention.

FIG. 3 shows a configuration of a more practical die for press brake utilizing the principle of the present invention.

The upper die 10 is made up of, for example, fifty of upper die elements 101, 102, ... 150.

Each element is formed with a corresponding punch portion, and element numbers "01" to "50" are put on the elements by laser beam machining.

When the upper die 10 is assembled, the elements are arranged in the order of element number, by which the upper die 10 is assembled exactly and easily. The elements are fixed by the fastening members $F_1$ such as bolts and nuts.

In the same way, the lower die 20 is also made up of fifty lower die elements 201, 202, ... 250.

On the lower die elements, element numbers "01" to "50" are put by laser beam machining.

The elements are arranged in the order of element number, and are fixed by the fastening members $F_1$, to complete the lower die 20.

The upper die 10 and the lower die 20 have required punch portion $P_1$ and die portion $D_1$, respectively.

Figure 4:
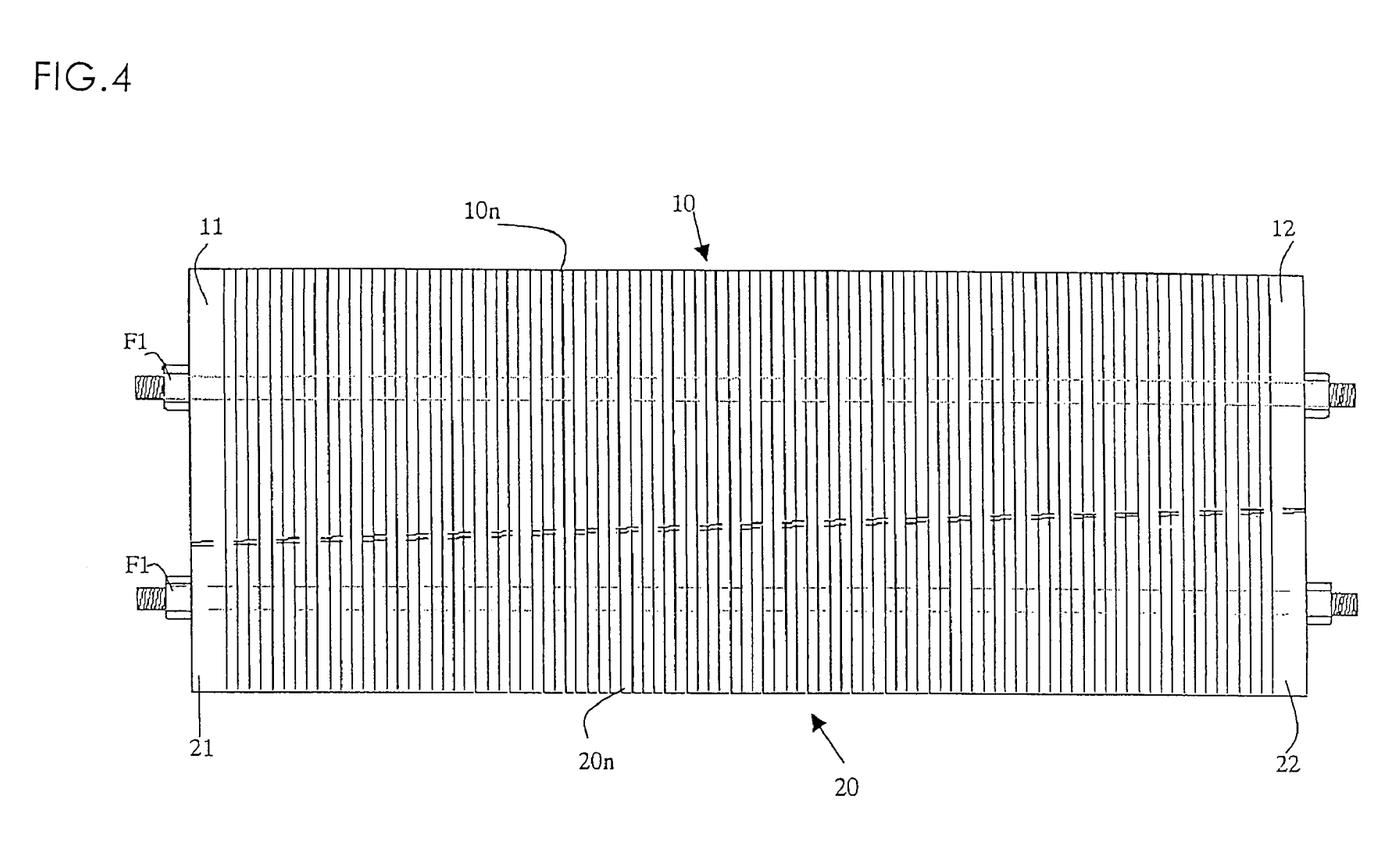
FIG. 4 is an explanatory view showing another example of the present invention.

FIG. 4 is an explanatory view showing another example of the present invention.

The upper die of this example is made up of the upper die elements $10n$ having a relatively small thickness. By decreasing the thicknesses of the upper die elements $10n$, the shape of the punch portion of each element can be fabricated more accurately. In the case where such thin elements are used, thick support plates 11 and 12 are disposed especially in both end portions, and the elements are fixed by the fastening members $F_1$.

By this construction, the upper die 10 having high rigidity can be obtained.

Similarly, the lower die 20 is also made up of the elements $20n$ having a small thickness. Thick support plates 21 and 22 are disposed in both end portions, and the elements are fixed by the fastening members $F_1$.

Figure 5:
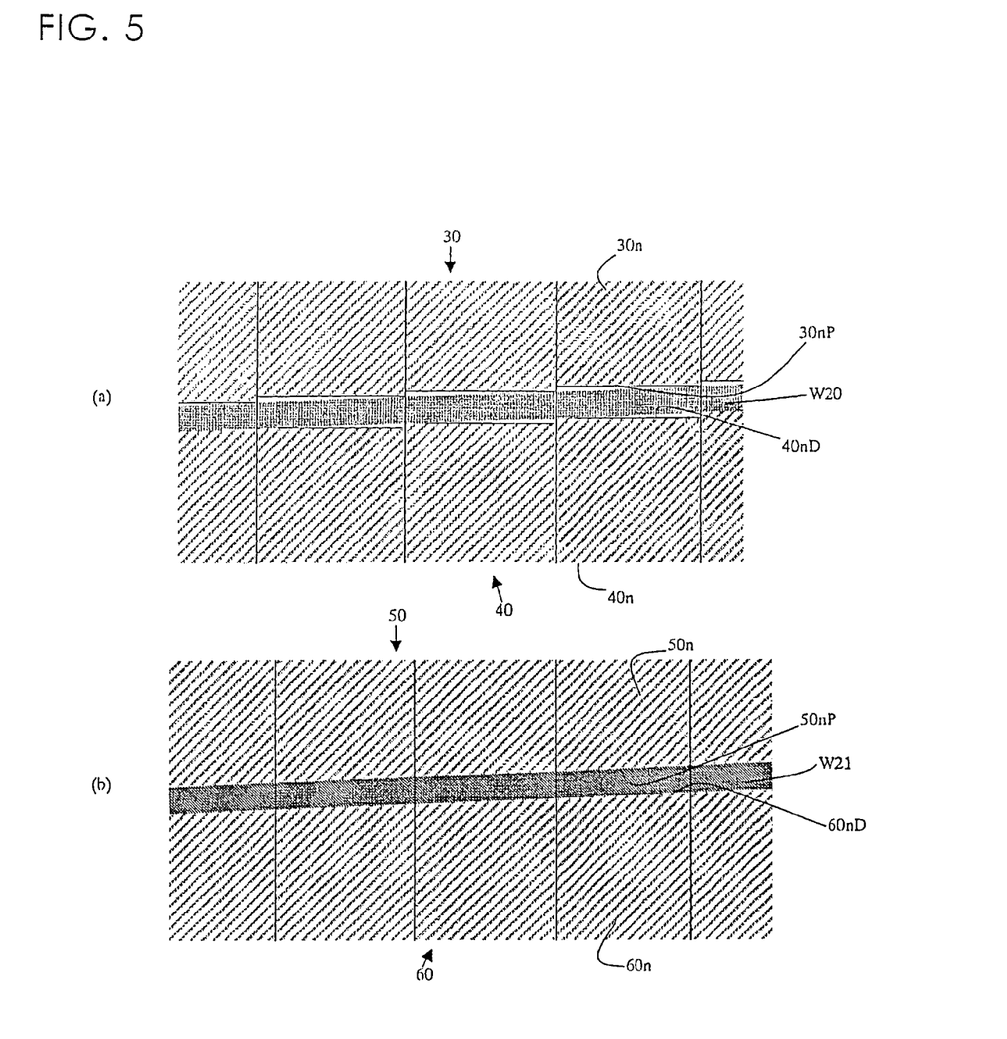
FIG. 5 is an explanatory view showing a difference between the case where each element of an upper and lower dies is fabricated by a two-dimensional laser and the case where it is fabricated by a three-dimensional laser.

FIG. 5 shows a difference between the case where each element of the upper and lower dies is fabricated by a two-dimensional laser and the case where it is fabricated by a three-dimensional laser.

FIG. 5(A) shows the case where each element $30n$ of an upper die 30 is fabricated by a two-dimensional laser.

The surface of a punch portion $30nP$ of each element is machined into a cross-sectional shape at right angles to the plate surface of element.

Similarly, an element $40n$ of a lower die 40 is also fabricated by a two-dimensional laser. A die portion $40nD$ of the element $40n$ has a cross-sectional shape at right angles to the plate surface of element.

When a work $W_{20}$ is pressed by using the upper die 30 and the lower die 40, the work $W_{20}$ is bent along the shape of the die. This fabricated shape is approximate to the required shape. However, since a difference in level is produced between the adjacent elements, there arises a drawback in that a flaw is induced on the surface of the work $W_{20}$ by this difference in level.

FIG. 5 (B) shows the case where an element $50n$ of an upper die 50 and an element $60n$ of a lower die 60 each are fabricated by a three-dimensional laser beam machine.

A punch portion $50nP$ of the element $50n$ of the upper die 50 can be machined so as to have a cross-sectional shape with an arbitrary angle with respect to the plate surface of element.

Therefore, no difference in level is produced in the adjoining portion of the elements $50n$. For this reason, the punch portion of the upper die 50 formed by assembling the elements $50n$ forms a smooth face.

Similarly, the element $60n$ of the lower die 60 is subjected to three-dimensional laser beam machining. Therefore, the die portion of the lower die 60 is also formed so as to have a smooth face.

When a work $W_{21}$ is pressed by using the upper die 50 and the lower die 60, no flaw is induced on the fabricated surface of the work $W_{21}$.

Figure 6:
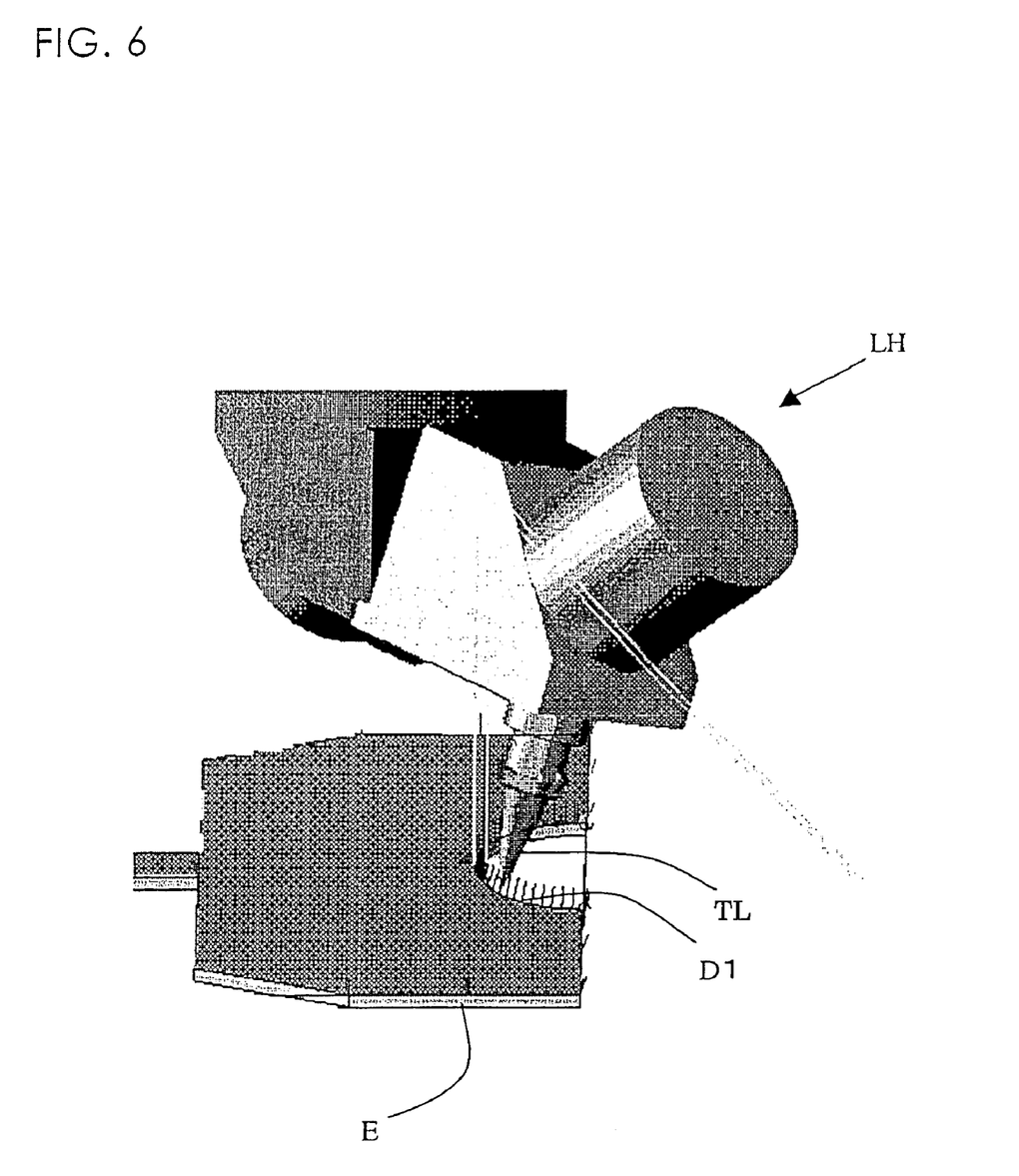
FIG. 6 is an explanatory view showing laser beam machining of a die portion of a die element.

FIG. 6 shows a state in which the die portion $D_1$ of a die element E is fabricated by using a laser beam machining tool TL of a three-dimensional laser beam machining head LH.

Figure 7:
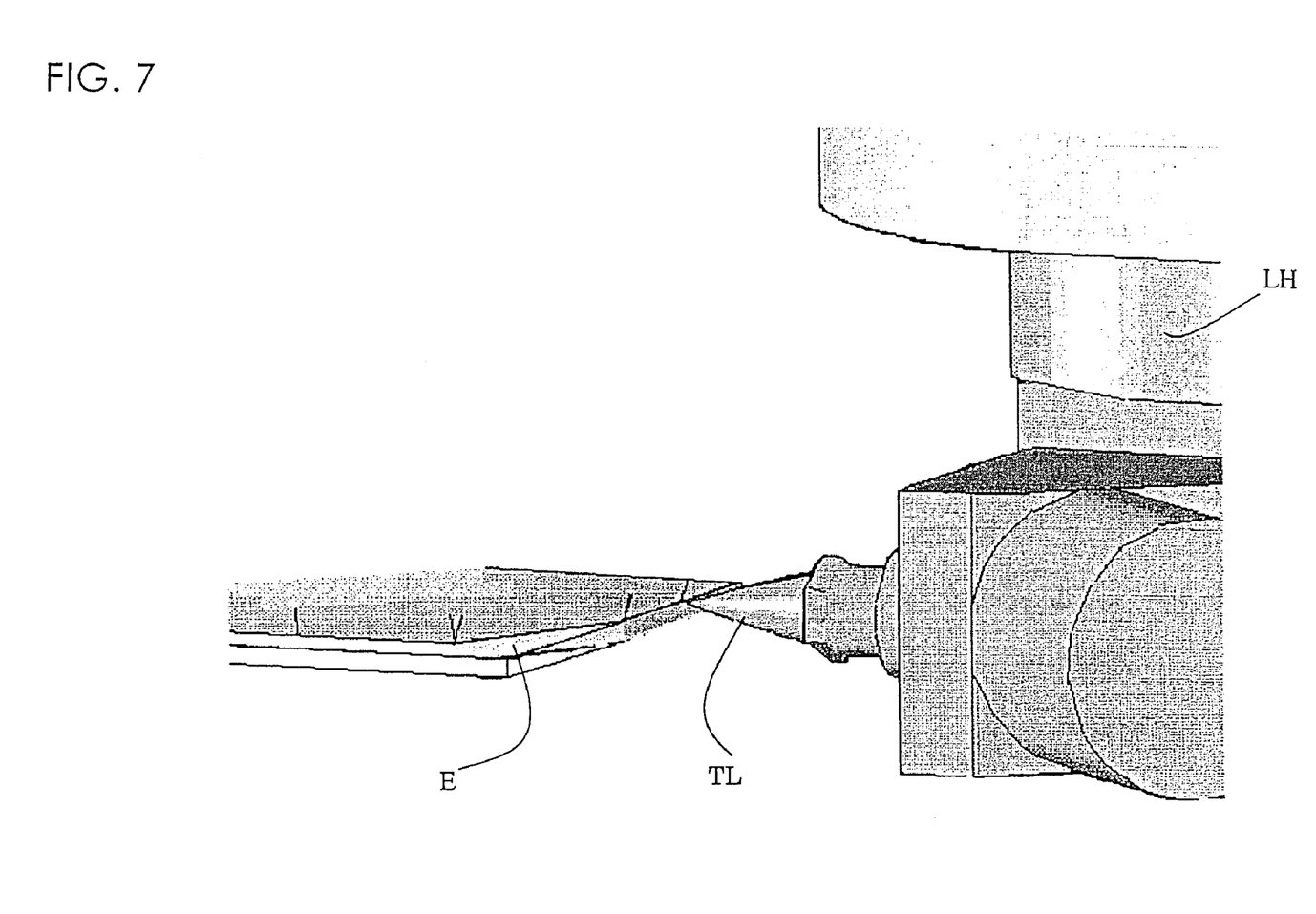
FIG. 7 is an explanatory view showing laser beam machining of a side portion of a die element.

FIG. 7 shows a state in which an element number is put on the side face of the die element E with an opposing laser beam machining head TL of a three-dimensional laser beam machining head LH.

Figure 8:
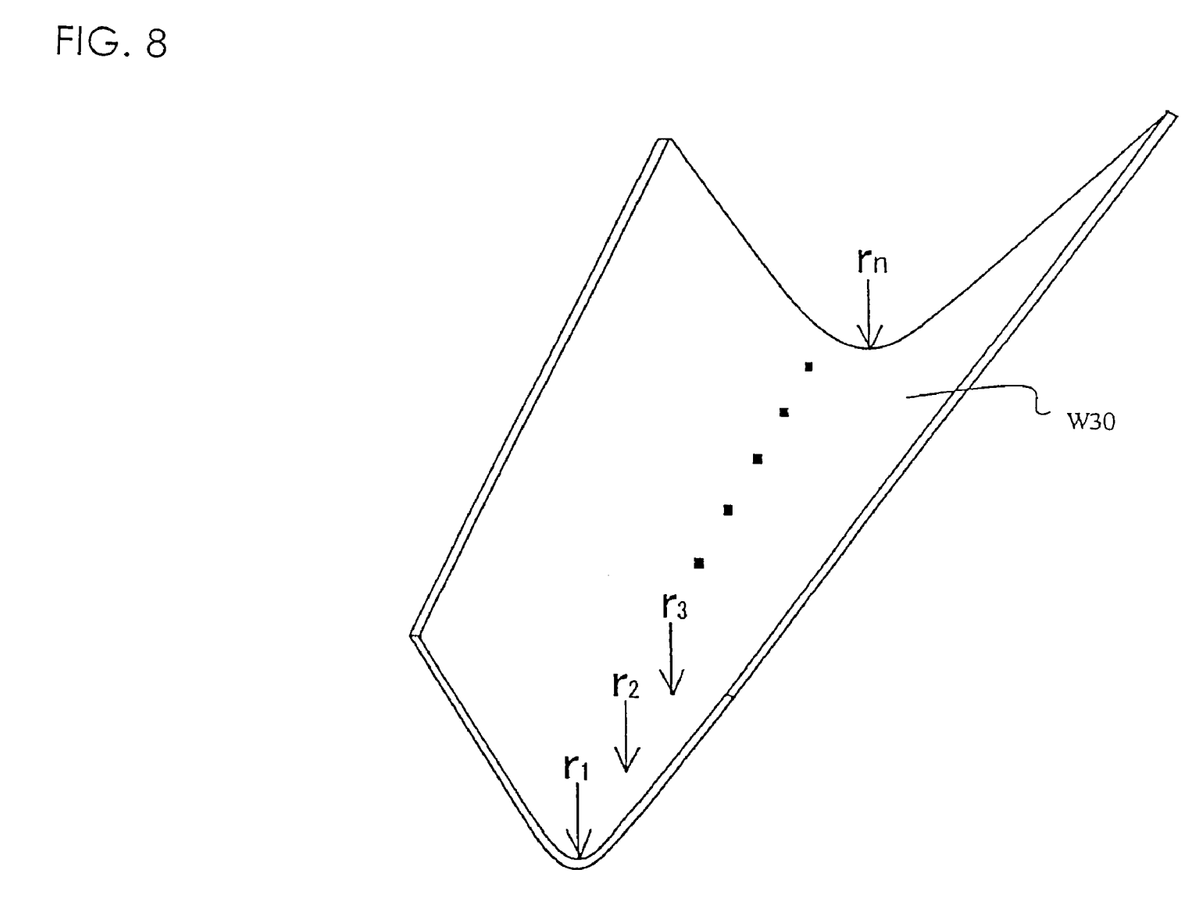
FIG. 8 is a perspective view showing an example of a work fabricated by the present invention.

FIG. 8 is a perspective view showing an example of a work formed by the die for press brake in accordance with the present invention.

A work $W_{30}$ has a shape such that the radius of curvature changes successively from $r_1$ to $r_n$ along the bend line.

In addition, according to the present invention, a work having an intricate shape can be fabricated.

What is claimed is:

1. A method for producing a die for a press brake which is formed by an upper die and a lower die, comprising the steps of:

preparing three-dimensional CAD data for a product to be bent;

preparing three-dimensional CAD data corresponding to shapes of the upper die and the lower die for the press brake based on the three-dimensional CAD data for the product, the upper die and lower die each having a respective surface for engaging and bending the product;

dividing the upper die and lower die into plate-shaped die elements having a uniform thickness based on the three-dimensional CAD data for the die, wherein each die element comprises a portion of one of the respective surfaces;

preparing a laser beam machining program for each divided die element;

manufacturing each die element by subjecting a raw material to laser beam machining by using the machining program;

producing the die by assembling the die elements, and further comprising the step of putting an element number on each die element by laser beam machining.

2. The method for producing a die for a press brake according to claim 1, wherein a die face of each die element is fabricated into a cross-sectional shape having an arbitrary angle with respect to a plate surface.

3. A die for a press brake, which is produced based on three-dimensional CAD data for a product to be bent, wherein the die has at least one surface for engaging and bending the product, and the die comprises plate-shaped die elements having a uniform thickness and each including a portion of the at least one surface;

each die element is fabricated into a predetermined shape by three-dimensional laser beam machining;

a fastening member for fastening all of the die elements is provided; and each die element has an element number put by laser beam machining.

4. The die for a press brake according to claim 3, wherein a die face of each die element is fabricated into a cross-sectional shape having an arbitrary angle with respect to a plate surface.

* * * * *